INVENTOR.
Ernest E. Wemp
BY Barnes, Kisselle, Laughlin & Raisch
ATTORNEYS.

March 10, 1953 — E. E. WEMP — 2,630,682
ROTARY HYDROKINETIC TORQUE CONVERTER
Filed Jan. 8, 1949 — 2 SHEETS—SHEET 2

INVENTOR.
Ernest E. Wemp
ATTORNEYS.

Patented Mar. 10, 1953

2,630,682

UNITED STATES PATENT OFFICE 2,630,682

ROTARY HYDROKINETIC TORQUE CONVERTER

Ernest E. Wemp, Detroit, Mich., assignor of five per cent to Eleanor May Wemp, Los Angeles, Calif., five per cent to Clyde J. Smith, five per cent to Leah Kathleen Smith, and twenty per cent to Lila A. Wemp, all of Detroit, Mich.; William O. Kronner and Lila A. Wemp, executors of said Ernest E. Wemp, deceased Application January 8, 1949, Serial No. 69,852

4 Claims. (Cl. 60—54)

This invention relates to hydro-kinetic torque converters and it has to do particularly with torque converters of the type which has a rotary torus chamber.

More particularly the invention is directed to improvements in a hydro-kinetic torque converter which embodies a permanently sealed torus chamber where the different parts are permanently connected together in their assembly, usually by means of welding. It will be at once appreciated that in an assembly of this kind difficulties are encountered where operating parts which may need servicing or other attention are disposed within the permanently sealed assembly.

The present invention aims to provide an improved construction in a hydro-kinetic torque converter which embodies such elements as the so-called pump or impeller, a rotor or driven member and a third element which serves as a stator. The stator must be so mounted and assembled that it may rotate in one direction only, so that when forces in the torus chamber tend to rotate the stator in the opposite direction it is held stationary. The invention accordingly provides a stator structure and a unidirectional coupling associated therewith, which is disposed so that it is accessible outside of the torus chamber. Also the arrangement is such that axial thrust on the stator may be met and overcome by thrust bearing means located outside the torus chamber. It is another aim of the invention to provide an improved arrangement for pumping and handling the hydraulic liquid so that the torus chamber is maintained full of liquid under some pressure and so that the liquid, which is usually a form of oil, may also be employed as a lubricating medium for some operating parts. Other objects of the invention will become apparent as the following detailed description is considered in connection with the accompanying drawings. The drawings show one form of construction made in accordance with the invention and in these drawings:

Figure 1:
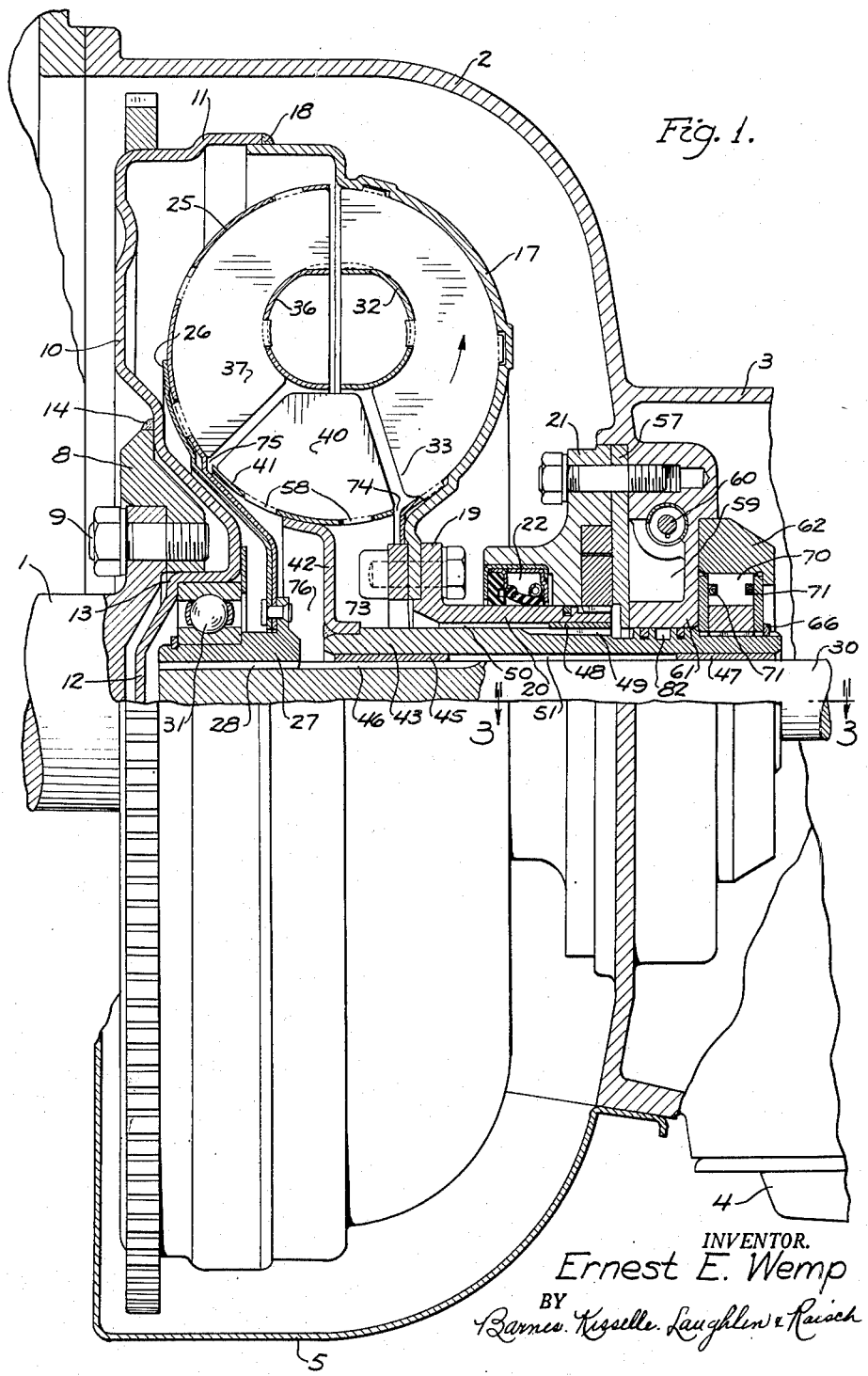
Fig. 1 is a view with some parts cut away and some parts in section showing the hydro-kinetic torque converter, the torus chamber structure thereof, and the thrust bearing.

The converter illustrated is shown in connection with an internal combustion engine or part thereof, and the crankshaft of the engine is illustrated at 1, and a bell housing which constitutes a part of the engine construction is shown at 2. This housing may be formed integrally with a casing shown in part at 3, which may be employed for housing gearing such as reverse gears and the like. The casing may, at its lower portion, be closed to provide a sump 4 for the hydraulic medium or oil, while the bell housing 2, may have a removable closure 5, as its lower closure.

The driving part of the converter is attached to the crankshaft and may include a hub like portion 8, secured to the crankshaft by bolts 9 and a forward member fashioned from sheet metal and having a forward wall 10 suitably shaped as shown to provide an outer flange 11. The forward wall 10 is preferably unbroken, the same having a central part 12. The metal of the forward wall is preferably fashioned to provide a recess formation 13 for purposes which will presently appear. This forward wall may be welded to the hub 8 as indicated at 14.

The torus chamber is formed by a rear wall member 17 welded to the flange 11 as at 18 with its inner part connected to a flange 19 of a hub 20. The hub 20 projects into a plate 21 which constitutes part of the housing and a suitable oil seal structure 22 is employed between the plate and the hub 20.

So much of the structure is driven directly by the crankshaft of the engine and constitutes the impeller or pump. Oppositely positioned from the wall 17 is the rotor or driven member which has a wall 25 which may be reinforced by a plate 26 and which is secured to a hub element 27 splined or otherwise keyed as at 28 to a power output shaft 30. The power output shaft is piloted in a bearing 31 located in the recess 13 in the forward plate 10.

The impeller is shown as having a core 32 with blades 33 positioned between the core and the wall 17. The rotor is similarly formed with a core 36 and blades 37 between the core and the outer wall 25. The stator has blades 40 mounted on a support or member 41 in turn mounted on a plate 42 which is secured to a sleeve 43. The blades 40 have tabs 58 for securement to the support 41. It will be seen that the torus chamber is comprised essentially of an outer wall constituted of the wall portion 17, the wall 25, and the support or wall 41 and the core pieces 32 and 36. These parts define the oil flow passages and the flow is in the direction of the arrow as shown.

The stator blades 40 are positioned in the path of flow.

The sleeve 43 is journalled on a bearing 45 which may be press-fitted over the shaft 30 and particularly over the groove or splined portion thereof, so that a channel 46 is provided, and on a bearing 47 also fitted on the output shaft 30. A bearing 48 is disposed between the sleeve 20 and the sleeve 43, and the sleeve 43 is grooved or splined to provide an oil flow passage 49 under the bearing 48, which passage connects into the space 50 between the two sleeves. The space 51 between the shaft 30 and the sleeve 43 also provides an oil flow passage.

Figure 3:
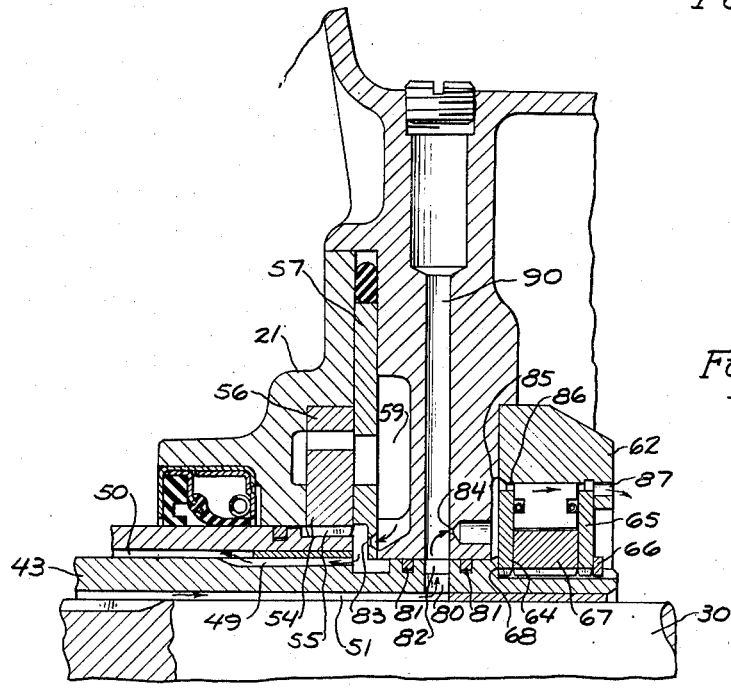
Fig. 3 is a sectional view taken substantially on line 3—3 of Fig. 1 showing structure positioned substantially at right angles to that shown in Fig. 1.

A pump for the hydraulic medium is preferably operated by the sleeve 20. As shown in Figs. 1 and 3, a pump member 54 is drivingly mounted on the end of the sleeve 20 as at 55, while a second pump member is shown at 56. The member 21 and an intermediate plate 57 are formed to provide a pump chamber and as shown in Fig. 3, the inlet side is not shown while the outlet or high pressure side is the chamber 59. A suitable high pressure relief valve is illustrated at 60 (Fig. 1).

The sleeve 43 extends through the rear wall of the housing 2 and specifically through the thickened portion 61 thereof and at the rear of the housing is a plate or ring 62 bolted or otherwise secured to the housing. Mounted on the outer end of the sleeve 43 and cooperating with the housing 2 and the plate 62 is a structure which constitutes a thrust taking bearing and also a one-way drive coupling. This structure includes a ring 64 which is splined or keyed to the sleeve 43 in abutting relationship with a shoulder 68 on the sleeve and which abuts a finished surface at the rear end of the housing 2 as shown in Figs. 1 and 3 and a plate or ring 65 also splined or keyed to the sleeve and held positioned by a lock or snap ring 66. Between these plates and keyed or splined to the sleeve is the inner element 67 of a one-way drive coupling as will be seen by reference to Fig. 2. The one-way drive coupling is advantageously of the sprag type which includes a multiplicity of closely associated sprags 70 (Fig. 2), all of which are slightly cocked in the same direction relative to a radial line extending through each individual sprag, and the sprags are yieldably acted upon by circumferential coiled springs 71. The sprags are positioned between the inner part 67 and the outer ring 62 which respectively have outer and inner circumferential surfaces for cooperation with and engagement with the sprags. Such one-way drive coupling is well known to those versed with the art and suffice it to say, considering Fig. 2, the inner member 67 is free to rotate counterclockwise in the direction indicated by the arrow, but cannot rotate clockwise as the slightly cocked sprags tend to straighten up to a radial position and perform a wedging or binding function.

When the device is operating, the pump 54—56 maintains oil under pressure in the torus chamber. The oil is drawn from the sump 4 to the inlet side of the pump and is pumped from the high pressure side 59 through the passage 49 through the passage 50 and thence into the torus chamber through the passage 73 on one side of the plate 42 and through the clearance space between the stator and impeller as indicated by 74. The pumped oil, in entering the torus chamber, flows in the direction of the movement of the oil or the hydraulic medium caused by operation of the impeller. The returning oil moves through passage 75 between the stator member 41 and the turbine element through passage 76 and through the passage 46 under the bearing 45 and through passage 51 between the output shaft 30 and the sleeve 43. The sleeve 43 has one or more apertures 80 therein which lead to a groove 82 and on each side of the groove is preferably sealing ring 81.

As will be appreciated by reference to Fig. 3, the hydraulic medium or oil is pumped from the high pressure chamber 59 of the pump through a metering port 83 in the plate 57. Also it will be seen that oil returning from the torus chamber flows through a metering port 84 where it is caused to lubricate the thrust surfaces and the one-way coupling. For this purpose the rear wall of the housing 2 may be provided with a recess 85 so that the oil may flow through and the ring 64 and ring 65 may be provided with flow passages 86 and the ring 62 may be provided with an oil flow port 87 so that the oil flows back into the sump 4. A passage 90 may be formed in the wall 2 to be normally closed by a plug and a pressure gage may be applied to ascertain the intermediate pressure maintained by the pump 54—56.

In the operation of the torque converter the impeller of the torus chamber is caused to rotate by the engine and the circuitous flow of the hydraulic medium is set up therein as indicated by the arrow in Fig. 1. The purpose of pumping the hydraulic medium by the pump 54—56 is to keep the torus chamber full of hydraulic medium under suitable pressure. The metering port 83 constitutes a pressure reducer so that the hydraulic medium, which is pumped into the torus chamber, is so pumped under suitable pressure and there is some flow of medium through the torus chamber as previously described. Obviously, this maintains oil under pressure in the area outside the torus chamber and between the wall member 25 and the front wall member 10. The pumped oil escapes through the pressure reducing port 84 and the oil thus flows over and lubricates the thrust bearing surfaces and the one-way drive coupling. Accordingly, three different pressure conditions exist, the normally high pressure in the outlet chamber 59 of the pump, an intermediate pressure in the torus chamber and a lower pressure on the outlet side of the reducer port 84.

Figure 2:
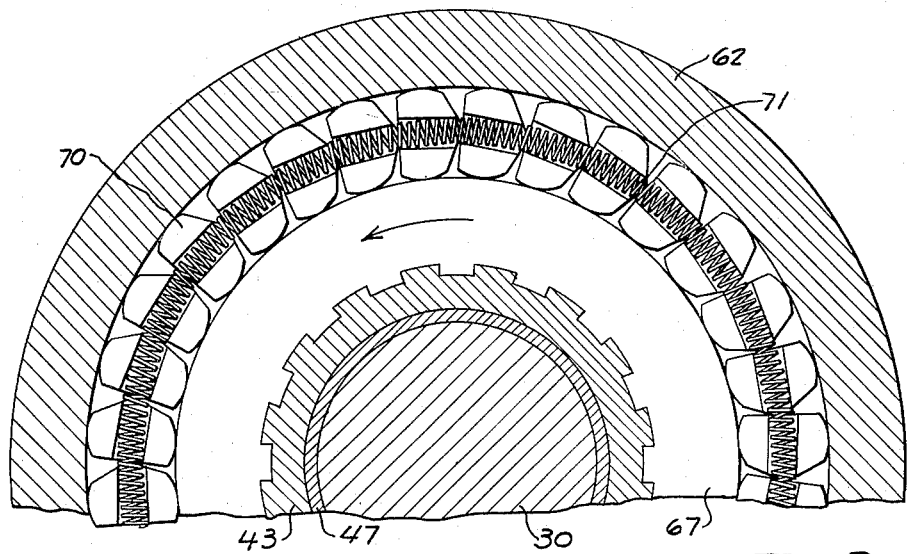
Fig. 2 is an enlarged sectional view illustrating a one way coupling used in connection with the stator.

Further, in the operation of the torus chamber, the stator is subjected to axial thrust incident to the action of the hydraulic medium on the blades 40 thereof, the stator being constituted by the plate 42 and the sleeve 43. The greater axial pressure on the stator occurs when the operating conditions are such that the stator tends to rotate clockwise as Fig. 2 is viewed. The stator cannot thus rotate and therefore it is held at zero speed. This thrust on the stator is to the right as Fig. 3 is viewed and the thrust is met and overcome inasmuch as the sleeve shoulder 68 abuts the plate 64 and the forces are transmitted through the member 67 to the plate 65 which abuts the inner flange portion of the ring 62. Thus there is a static condition in that the stator is not rotating and the plate 62 is not rotating and the thrust surfaces abut each other without relative rotation. This arrangement accordingly minimizes wear of the thrust surfaces and, in fact, substantially eliminates wearing conditions. Under other conditions in the torus chamber the stator is rotating and the thrust thereon is due, at least in some considerable measure, to the frictional engagement of the hydraulic medium with the blades 40. This thrust, which is to the left as Fig. 3 is viewed, is overcome through the means of the snap ring 66. Thrust forces are transmitted through plate 65, member 67 and plate 64 which thrusts against the end of the housing 2. At this time there is relative rotation between the thrust surface because the stator and the plate 64 are rotating and plate 64 engages the stationary surface of the housing. As mentioned above, this in a relatively light axial thrust and frictionally engaging the surfaces will suffice particularly as they are well lubricated as indicated and moreover if working parts ever need repair or replacement, or if the one-way coupling needs repair or replacement, these parts are freely accessible as they are entirely outside of the permanently welded up torus chamber.

It will accordingly be observed that the unidirectional coupling constituted by the sprags 70 and the associated parts 67 and 62 is readily accessible from the exterior so that it may be easily attended to or serviced for any reason. Moreover, the thrust bearing plates are likewise accessible for attention or service.

I claim:

1. In a hydro-kinetic torque converter, a torus chamber for hydraulic medium including an impeller, a rotor and a stator, a pump operated by the impeller for pumping the hydraulic medium into the torus chamber, a flow system for conducting the hydraulic medium from the high pressure side of the pump to the torus chamber and from the torus chamber to a point of discharge, first restricting port means positioned in the system between the high pressure side of the pump and the torus chamber for reducing the pressure of the pumped medium, second restricting port means in the system positioned between the torus chamber and the point of discharge, the said second restricting port means being more restricting than the first, whereby the torus chamber is maintained full of hydraulic medium at a relatively low pressure and one way coupling means and thrust bearing means for the stator positioned to receive the hydraulic medium after the same passes through the second restricting port means thus being lubricated thereby.

2. For a hydro-kinetic torque converter having a housing and rotor elements therein, a sleeve connected to one of the elements of the torque converter and extending through the housing so that one end thereof is exposed, an annular plate secured to the housing and having an internal circumferential surface spaced from the exposed end of the sleeve, unidirectional coupling means between the internal circumferential surface of the annular plate and the outer surface of the exposed end of the sleeve, a thrust ring within the annular plate located on one side of the unidirectional coupling means and arranged to thrust against the housing, a second thrust ring positioned on the opposite side of the unidirectional coupling means, said unidirectional coupling means having an element for holding the thrust rings separated, a thrust member fixed to the sleeve for engaging the outer face of the second ring, and a flange on the annular plate overlapping the second thrust ring and against which the second thrust ring is adapted to thrust.

3. The construction as recited in claim 2 characterized in that there is a pump for pumping hydraulic medium under pressure into the torque converter, means for discharging the hydraulic medium from the torque converter including a restricted discharge port for discharging hydraulic medium from the hydro-kinetic torque converter between the first mentioned thrust ring and the housing, said first mentioned thrust ring having a port therein for the flow of the hydraulic medium therethrough and into the space between the thrust rings, said second thrust ring having a port therethrough adjacent the thrust surfaces of said ring and the flange of the annular plate whereby the thrust surfaces and unidirectional coupling means are lubricated.

4. For a hydro-kinetic torque converter having a housing and rotor elements therein, a sleeve connected to one of the elements of the torque converter and extending through the housing so that one end thereof is accessible outside the housing, the housing having a part surrounding the exposed end of the sleeve and having an internal circumferential surface spaced from the external surface of said end of the sleeve; said end of the sleeve having a shoulder, a thrust washer positioned on the sleeve substantially against the shoulder and located to engage the housing, a second thrust washer spaced from the first and mounted on the sleeve, thrust means fixed on the sleeve for engaging the outside face of the second washer, the housing part having a flange for engaging the outside face of the second washer, and unidirectional coupling means positioned between the washers and cooperating with the internal circumferential surface of the housing part and with the external surface of the sleeve and having parts for holding the thrust washers separated.

ERNEST E. WEMP.

REFERENCES CITED

The following references are of record in the file of this patent:

UNITED STATES PATENTS

| Number | Name | Date |
|---|---|---|
| 1,970,236 | Kluge et al. | Aug. 14, 1934 |
| 2,037,252 | Martyrer et al. | Apr. 14, 1936 |
| 2,074,346 | Sinclair | Mar. 23, 1937 |
| 2,100,191 | Lapsley | Nov. 23, 1937 |
| 2,128,828 | Klepper | Aug. 30, 1938 |
| 2,149,117 | Dodge et al. | Feb. 28, 1939 |